Patented Feb. 19, 1929.

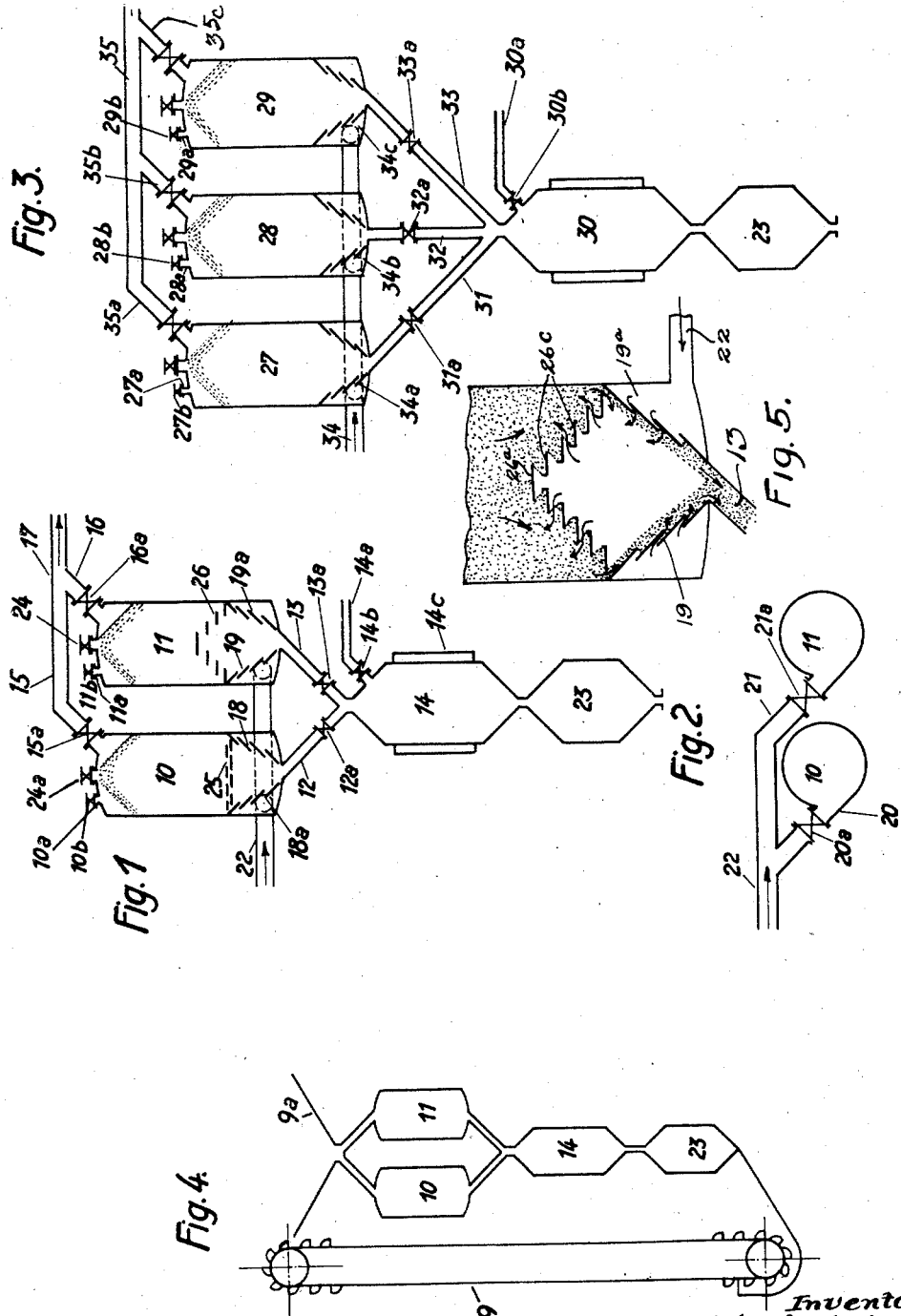

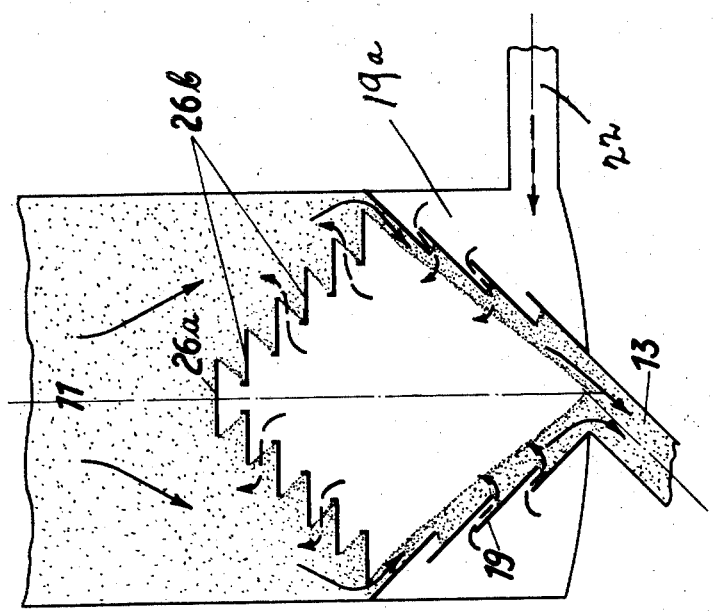

1,702,311

UNITED STATES PATENT OFFICE.

VITALIS PANTENBURG, OF FRANKFORT-ON-THE-MAIN, GERMANY.

PROCESS FOR RECOVERING GASES AND VAPORS FROM GAS MIXTURES.

Application filed January 28, 1926, Serial No. 84,444, and in Germany February 7, 1925.

This invention relates to the treatment of gas or vapor mixtures for separating therefrom one or more of its constituents, by means of granular adsorption media such as active carbon, silica gel, porous alumina, etc.

Heretofore two methods have been followed. One of these methods, generally referred to as the intermittent method, consists in passing the gaseous mixture through a body of adsorption material at rest in a chamber. During the adsorption cycle the adsorption material is as a rule cooled to increase its adsorptive capacity while during the regeneration cycle heat is applied to it to liberate the adsorbed gases or vapors, as is well understood. This method has considerable disadvantages from the standpoint of thermal efficiency since the adsorption, on the one hand, and regeneration on the other hand, require opposite thermal conditions. While adsorption is promoted by transfer of heat away from the body of adsorption material, regeneration depends on transfer of heat to it. It is thus manifest that the operation according to this method has as an unavoidable incident the heating and the cooling of the container body, i. e. a transfer to and dissipation of heat energy in the container body which not only represents a net loss but also requires a cooling system and a heating system coniderably larger than is required for effecting the required useful heat transfer from and to the body of adsorption material alone.

It is principally for this reason that the so called continuous method was evolved and developed. This method essentially consists in transferring the adsorption material, in cyclic order, from an adsorption chamber to a regenerating chamber and back or through a series of adsorption chambers and regenerating chambers alternating with each other, a practice which is fairly represented by the disclosure in the United States patents to Soddy, Nos. 1,422,007 and 1,422,008.

While by the continuous method just referred to the mentioned disadvantages incident to the intermittent method are largely avoided and a much better thermal efficiency is attained, there are various other disadvantages of different nature which militate against the continuous method and, at times, impede it or even prevent the successful execution thereof. It has been observed that it is extremely difficult to effect a substantially uniform movement of the adsorption material through the vertical shafts. Some of the material remains too long in the adsorption space with the result that it becomes ineffective as adsorbent and that gaseous mixtures coming into contact with it in this condition are not acted upon. Other portions of the material pass so rapidly through the adsorption space that they are not adsorptively charged to the maximum of the adsorptive capacity and thus pass into the regenerating space with a relatively low gas or vapor charge which again means a lowering of the efficiency.

Another difficulty incident to the movement of the adsorption material in countercurrent relation to the gaseous mixture treated is presented by the problem of adequately separating the adsorption space from the regeneration space so that charged adsorption material may continuously pass from the former to the latter while the gaseous mixture is strictly confined to the former. This is absolutely essential when either the adsorption medium or the gas or vapor to be adsorbed is combustible or explosive in the presence of oxygen at the regeneration temperature, as for instance is the case when the adsorption medium is active carbon or the substance to be adsorbed is gasoline, and the gaseous mixture contains oxygen, as in the case of a gasoline-air mixture to be separated. The difficulties in this respect are particularly great when the oxygen-containing mixture is under a relatively high pressure. For the adsorption operation the higher pressure is particularly advantageous, while for regeneration it is undesirable. It is therefore a practical desideratum that the pressures in the adsorption space be maintained higher than in the regeneration space, which was not practically feasible up to now in connection with the continuous method.

The present invention has as its principal object a method of the kind involved in which the advantages of thermal efficiency characteristic of the continuous method are fully materialized while the corresponding disadvantages mentioned are entirely avoided.

The invention essentially consists in moving the adsorption material in succession through an adsorption space and a regenerating space in endless cycles, in such a way that the adsorption material during adsorption is at rest and entirely separated from other parts of the circulation system. It is the principal characteristic of the invention that at least two adsorption chambers are combined with a common regenerating chamber.

For a full understanding of the invention and the principle of operation upon which it is based, reference is made to the accompanying drawings in which:

Fig. 1 is a diagrammatic representation of a structural arrangement embodying the invention;

Fig. 2 is a fragmentary plan view thereof showing connections insufficiently shown in Fig. 1;

Fig. 3 is a diagrammatic representation of a modification;

Fig. 4 is a diagrammatic representation of an arrangement such as shown in Fig. 1, including a conveyor system for circulating the adsorptive material; and Fig. 5 is a detail in cross-section of an arrangement for discharging adsorptive material from the adsorption vessel.

In the drawings 10 and 11 represent two pressure vessels defining adsorption chambers connected at the bottom by means of conduits 12 and 13, controlled by gates 12$^a$ and 13$^a$, respectively, with a regeneration chamber 14. To the latter is connected a gas conduit 14$^a$ controlled by a valve 14$^b$ or the like, for conducting away the gases or vapors set free by the regeneration. At the top the vessels 10 and 11 are connected by means of branches 15 and 16 controlled by means of valve or gates 15$^a$ and 16$^a$, respectively, with a conduit 17. In the bottom portion, the vessels 10 and 11 have conical supports 18 and 19 formed of slats or boards in cascade arrangement resembling louvre shutters, the mouths of which register with the conduits 12 and 13, respectively. These supports defines surrounding gas spaces 18$^a$ and 19$^a$ which are connected through branches 20 and 21, controlled by valve 20$^a$ and 21$^a$, respectively, to a conduit 22.

The operation is as follows:

Assume that the chamber 10 is filled with reactivated or regenerated adsorptive material ready to be charged. Valves 20$^a$ and 15$^a$ are open while gate 12$^a$ is closed. The gaseous mixture enters the gas space 18$^a$ preferably tangentially as shown and therefor uniformly fills the circular space about the support 18 and enters radially in all directions through the parallel spaces of the louvre-shutter support and thus flows substantially uniformly through the body of the adsorptive material at rest, giving up the constituent to be separated, and the remaining gas flows out through branch 15 into the conduit 17 where it may be collected or disposed of in any desired manner.

Assume also that at the same time material adsorptively charged in vessel 11 is simultaneously regenerated in the regenerating chamber 14. Valves 16$^a$ and 21$^a$ are closed while the gate 13$^a$ is open. However, in the case when adsorption has been effected under pressure, the pressure in vessel 11 must first be reduced and equalized with the pressure in the regenerating chamber. To this end are provided conduits 10$^a$ and 11$^a$ controlled by valves 10$^b$ and 11$^b$, respectively, for permitting gas to escape out of vessel 10 or 11, as the case may be, and thereby reduce the pressure within. The action in the regenerating chamber itself may be in accordance with the usual or any preferred practice. Thus, regeneration can be effected, for instance, by passing superheated steam through the material or by indirectly heating it or by a combination of both methods. In the case of indirect application of heat, the regenerating chamber may be advantageously provided with a heating jacket 14$^c$. After regeneration the material is transferred back to the vessel 11 after being cooled in the usual way by passing it first through a cooler 23. The regenerated material is transferred by means of any suitable conveyor 9 to a hopper 9$^a$ and re-enters vessel 11 through the intake 24, the chamber 10 having a similar intake 24$^a$.

The charged material in vessel 10 is then regenerated, while the regenerated material in vessel 11 is charged. The regenerated material is returned to the vessel 10 through the intake 24$^a$. The operation is thus continued by alternately charging material while at rest in one of the vessels 10, 11 and regenerating material in the regenerating vessel 14.

The transfer of the material from the vessel 10 or 11 to the regenerating chamber and then back to the vessel 10 or 11 may be effected intermittently or continuously.

In the latter case, one of the vessels 10 or 11 is connected to the gas conduit 22, while from the other the charged material is passed in a continuous operation to the regenerator, which is constantly filled with material. The regenerated material is likewise continuously withdrawn from the bottom of the regenerating chamber 14 and transferred to that adsorber vessel from which the regenerator receives the charged material. When the transfer has been completed and the particular adsorber vessel is filled with regenerated material, the cycle is reversed. The material is thus continuously moving through and out of the regenerating vessel.

In order to prevent a mixing between the regenerated material being fed into the adsorber vessel and the material being discharged from it, it is necessary in that case to provide means for effecting a uniform downward movement of the material in the adsorber vessel. As an effective means to that end, I provide a plurality of round or polygonal disk-like bodies 25 of different sizes and in such relative spacing that the incoming material and the outgoing material in their downward course define a substantially constant contact surface and do not mingle. Instead of plates 25 in the relation described, similar plates 26 may be superposed in staggered relation. For the sake of illustration I have shown both arrangements in the same apparatus. In Fig. 5 are shown in detaail these arrangements as well as the arrangements by means of which the gas or vapor mixtures are introduced for subjection to the adsorptive treatment. $26^a$ is a centrally located circular plate beneath which are arranged a number of annular plates $26^b$ of different diamters and vertically spaced from each other as shown. These plates as a whole constitute a kind of upwardly tapering cone, and the adsorptive material flows over the separated annular plates according to its natural slope towards the periphery of the vessel. From the periphery of the vessel, the adsorptive material flows over the annular sheets 19 arranged in a hopper-like formation, and is directed into the exit 13. As shown in Figs. 1 and 2, the gas is introduced into the space $19^a$ surrounding this hopper. From this space the gas or vapors is or are passed through the slits of the sheets which form this exit hopper and through the layer of adsorptive material into the hollow space which lies underneath the annular plate $26^b$. From this space the gas streams through the vertical spaces of the horizontally arranged annular plates into the main body of adsorptive material, and after passing therethrough flows into the exit pipe at the top of the adsorbing chamber. Any other instrumentality for regulating the flow of the material in the adsorber vessels may be used.

Means for regulating the flow of the material may be obviated by employing three adsorber vessels 27, 28 and 29, as shown in Fig. 3, where 30 represents the common regenerating chamber connected to the adsorber vessels by the conduits 31, 32 and 33, controlled by valves $31^a$, $32^a$ and $33^a$, respectively. For carrying off the gases or vapors liberated during regeneration, there is provided a conduit $30^a$ controlled by a valve $30^b$ or the like. A common gas feed main 34 is connected with the adsorbers by valved branches $34^a$, $34^b$ and $34^c$, while the tops of the adsorbers are connected by valved branches $35^a$, $35^b$ and $35^c$ to a conduit 35. The vessels 27, 28 and 29 are provided with conduits $27^a$, $28^a$ and $29^a$ controlled by valves $27^b$, $28^b$ and $29^b$, respectively, for releasing the pressure within any one of the vessels.

The operation in this case is so conducted that one of the adsorbers is always connected to the gas main, while from one of the other two adsorbers charged material flows into the regenerating vessel and material from the regenerating vessel moves to the third adsorber. As soon as the second adsorber is empty and the third adsorber is filled, the gas stream is passed into the latter while the first adsorber is being emptied and the second adsorber is being filled. This arrangement precludes the possibility of a mixing of charged material with regenerated material.

At any rate, the adsorption operation is carried out with the material at rest and the adsorption, on the one hand, and the regeneration, on the other hand, may be carried out under entirely different pressures.

The two forms of apparatus diagrammatically referred to, are of course not the only apparatus available for carrying out the invention. However, I found that they are particularly suited for the purposes of the invention.

The arrangement shown in Fig. 3 has also particular utility in cases where the gas separation is carried out under high pressure. In such cases, after the adsorption operation in one of the adsorbers is completed, the gas pressure therein must be gradually reduced to the pressure in the regenerator. This reduction must be gradual since otherwise adsorbent material would be carried out with the escaping gas. The rate at which gas should be allowed to escape, however, would be too slow to be practical. For this reason a larger number of adsorbers facilitates the operation, inasmuch as in one of the adsorbers the gas pressure may be reduced while in another the adsorption takes place and the charged material from still another adsorber passes to the regenerator.

For a continuous movement of the material through the regenerator it would be necessary to employ at least four adsorbers or to employ three adsorbers provided with means for regulating the flow of material through the adsorbers, such as disks 25 or 26, or other equivalent means.

While the invention is particularly adapted for separation of gaseous mixtures by adsorption under high compression, the advantages are not limited thereto.

I claim:

1. Apparatus for separating gaseous mixtures by adsorption, comprising a plurality of adsorption chambers having each an intake and an outlet for the adsorption material, a regenerating chamber, valve controlled connections between the latter and the outlets of the separate adsorption chambers and separate valve-controlled gas inlets and outlets for the adsorption chambers.

2. Apparatus according to claim 1, in which each adsorption chamber has near its bottom an annular gas chamber separated from the adsorption space by an apertured partition, the gas inlet for each adsorption chamber being connected to the said gas chamber.

3. Apparatus according to claim 1, in which each adsorption chamber has near its bottom an apertured funnel-shaped partition defining an annular gas chamber separated from the adsorption space by the partition, the gas inlet for each adsorption chamber being connected to the said gas chamber.

4. Apparatus according to claim 1, in which each adsorption chamber has near its bottom a conical funnel-shaped apertured partition defining an annular gas chamber separated from the adsorption space by the partition, the gas inlet for each adsorption chamber being connected to the said gas chamber and entering it substantially tangentially.

5. Apparatus according to claim 1, in which each adsorption chamber is provided with means for causing the adsorption material to move substantially uniformly from top to bottom.

6. Apparatus according to claim 1, in which each adsorption chamber is provided with a plurality of disk-like bodies disposed in spaced relation so as to cause the adsorption material to move substantially uniformly from top to bottom.

7. Process for the separation of substances from gas, vapor or gas-vapor mixtures, by adsorption, characterized thereby that the substance to be separated is adsorbed alternately under high pressure in several adsorption chambers by suitable adsorption material and that as soon as the adsorption material has taken up a sufficient quantity of the substance to be separated, the pressure in the adsorption space is diminished whereupon the adsorption material is conducted into a separate common heating chamber, and there, at lower pressure, the adsorptively held materials are driven out, so that the adsorption material becomes useful again for the adsorption treatment of gas, vapor or gas-vapor mixtures 8. Process for the separation of substances from gas, vapor or gas-vapor mixtures, by adsorption, characterized thereby that the substance to be separated is adsorbed alternately under high pressure in several adsorption chambers by suitable adsorption material, while maintaining the adsorption material at rest therein, and that as soon as the adsorption material has taken up a sufficient quantity of the substance to be separated the pressure in the adsorption space is diminished whereupon the adsorption material is conducted into a separate common heating chamber, and there, at lower pressure, the adsorptively held materials are driven out, so that the adsorption material becomes useful again for the adsorption treatment of gas, vapor or gas-vapor mixtures.

9. Process for the separation of substances from gas, vapor or gas-vapor mixtures by adsorption characterized thereby that the substances to be separated are adsorbed alternately under high pressure in separate adsorption chambers by suitable adsorption material, alternately releasing the pressure in the adsorption chambers after completion of the adsorbing operation and alternately passing the adsorption material from the adsorption chambers into and through the common stripping chamber, and there, at lower pressure, driving out the adsorptively held materials.

In testimony whereof, I affix my signature.

VITALIS PANTENBURG.